United States Patent [19]
Smith

[11] 3,804,189
[45] Apr. 16, 1974

[54] LOAD CARRYING VEHICLES

[75] Inventor: Richard Terence Smith, Wolverhampton, England

[73] Assignee: Rubery, Owen & Co. Limited, Darlaston, Wednesbury, Staffordshire, England

[22] Filed: July 26, 1972

[21] Appl. No.: 275,349

[52] U.S. Cl. ............... 180/24.02, 180/45, 280/91, 280/124 F
[51] Int. Cl. ............................................. B62d 61/10
[58] Field of Search ........ 214/394; 180/225, 23, 24, 180/24.02, 45; 280/81 R, 91, 124 F

[56] References Cited
UNITED STATES PATENTS

| | | | |
|---|---|---|---|
| 3,482,720 | 12/1969 | Tax et al. | 214/394 |
| 2,952,326 | 9/1960 | Page | 180/24.02 |
| 3,567,242 | 3/1971 | Miller | 280/91 |
| 3,703,243 | 1/1972 | Monn | 214/394 |
| 2,790,650 | 4/1957 | Boschi | 280/124 F |
| 3,653,683 | 4/1972 | Hendrichsov | 280/124 F |

Primary Examiner—Stanley H. Tollberg
Assistant Examiner—Larry Martin
Attorney, Agent, or Firm—Scrivener, Parker, Scrivener & Clarke

[57] ABSTRACT

A straddle carrier for freight containers has three or four wheels on each side, the outer wheels being unsprung and the inner wheel or wheels being the driving wheels and being suspended from the chassis by pneumatic units. The volume of these units is small compared to the volume of the air supply vessel so that the volume/pressure change is small when the carrier is loaded or unloaded.

10 Claims, 5 Drawing Figures

LOAD CARRYING VEHICLES

This invention relates to self-propelled load carrying vehicles particularly for handling freight containers.

According to the invention each side of a self-propelled load carrying vehicle has at least one wheel non-yielding attached to the vehicle at or adjacent each end and at least one driving wheel which is arranged between the end wheels and which is elastically suspended from the vehicle such that its load is substantially constant whether the vehicle is laden or unladen.

According to one embodiment of the invention each side of the vehicle has four wheels arranged in pairs in tandem, the inner wheel of each pair being elastically suspended from the vehicle such that when the vehicle is unladen they support the major proportion of the vehicle weight.

Preferably, when the vehicle is fully loaded the arrangement is such that the weight of the vehicle is shared substantially equally between all the wheels.

According to a further embodiment of the invention there are provided one or more wheels at or adjacent each end of the vehicle non-yielding attached thereto and intermediate the ends there is provided at least one driven wheel which is elastically suspended from the vehicle such that the elastically suspended wheels are substantially constantly loaded whether the vehicle be laden or unladen.

As examples of the invention straddle carriers for handling freight containers will be described with reference to the accompanying drawings in which.

Figure 1:
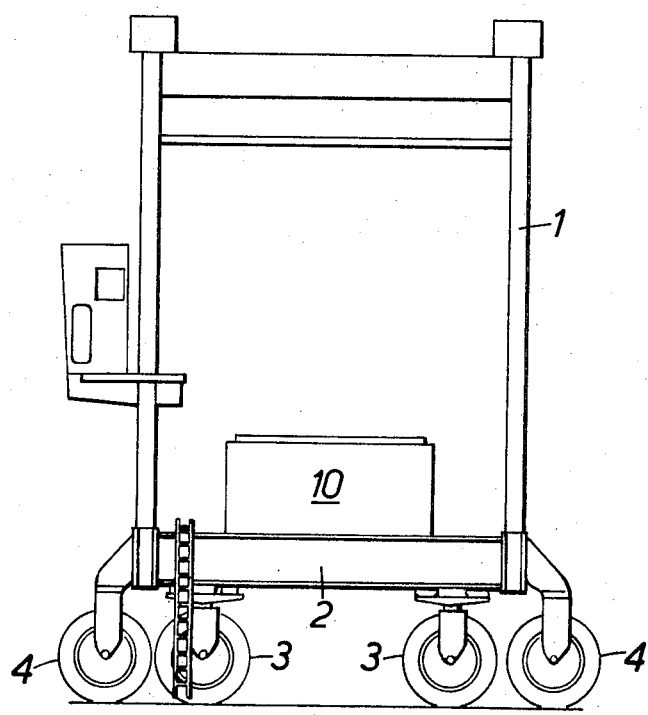
FIG. 1 is a diagrammatic side view of a straddle carrier.

The straddle carrier of FIGS. 1 – 4 has a chassis comprising front and rear frames of rigid construction and inverted U-shape. The legs 1 of these frames on each side of the vehicle are connected adjacent their lower ends by a substantial longitudinal member 2 which is stiff in bending but is able to twist under loads transmitted by wheels, mounted adjacent the foot of each leg, when the vehicle passes over an uneven surface.

Two wheels 3 and 4 are mounted in tandem adjacent the foot of each leg 1. The outer wheel 4, that is to say the leading or trailing wheel on each side of the vehicle, is unyieldingly connected to its leg, that is to say without interposition of any spring medium.

Figure 4:
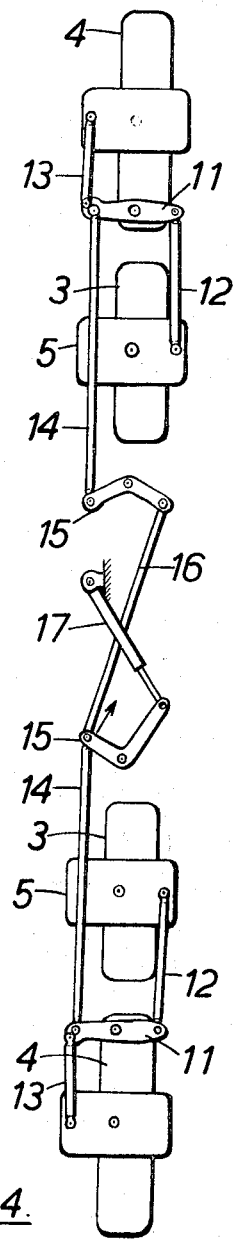
FIG. 4 is a diagrammatic representation of the steering mechanism for the wheels on one side of the straddle carrier.
Figure 2:
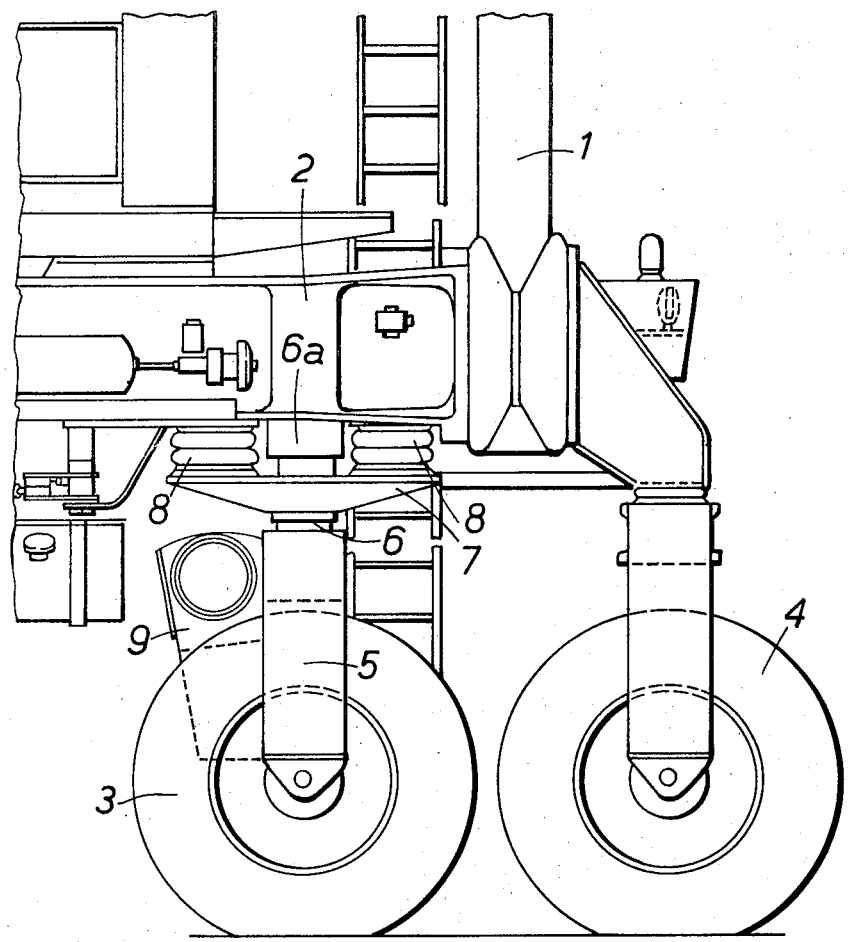
FIG. 2 is a side elevation of a pair of wheels on the straddle carrier.
Figure 3:
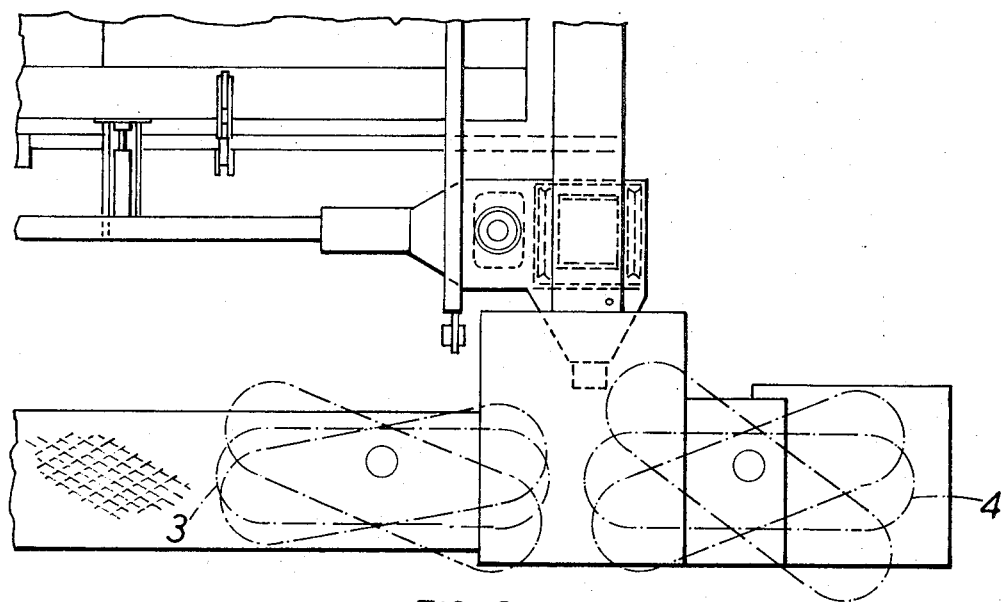
FIG. 3 is a plan view on the wheels of FIG. 1.

The inner wheel 3 of each pair is mounted in a generally vertical yoke 5 from which a steering tube 6 passes upwardly through a bearing assembly 6a carried by the longitudinal member 2 for connection to the steering mechanism shown in FIG. 4. The steering tube is rotatable in the bearing assembly and is also slidable up and down therein. A collar on the steering tube 6 immediately above the yoke 5 is engaged by a thrust bearing carried by a bridge member 7 which extends in front of and behind the yoke. Between the underside of the longitudinal member 2 and the upper surface of the bridge member 7 two rubber enclosed compressed air suspension units 8 are fitted, one in front and the other behind the steering tube 6. The steering tube is thus enabled to telescope in the bearing assembly with flexing of the suspension units.

The suspension units 8 are arranged so that when the vehicle is unladen a major proportion of the weight is borne by the inner wheels 3 of each pair. When the vehicle is laden the suspension units 8 yield maintaining a generally constant load on the inner wheels 3, and the increased weight is borne substantially wholly by the leading and trailing wheels 4. The suspension units 8 also flex to maintain wheel contact with the ground when the vehicle negotiates gentle gradients and undulating ground, where the undulations are of small amplitude and long pitch.

An hydraulic motor 9 is mounted on the yoke 5 of each of the inner wheels 3 and is supplied with pressure liquid from a pump or pumps driven by an engine 10 on the vehicle. There may be an engine 10 on each side of the vehicle. Alternatively, the vehicle can be driven through only one sprung wheel on each side and at the same end of the vehicle.

The vehicle is hydraulically braked by the motors 9, though wheel or transmission brakes can be fitted to the inner wheels 3. Additional brakes can be provided on the outer wheels 4.

As shown in FIG. 4 the wheels 3 and 4 are interconnected for steering movement and the wheels at the front of the vehicle are connected to the wheels at the rear of the vehicle. In the steering mechanism an arm 11 is pivoted intermediate its ends to the vehicle chassis at a position between the wheels 3 and 4. The ends of the arm 11 are pivotally connected to the wheels 3 and 4 by links 12 and 13 respectively, the arrangement being such that the inner wheels 3 turn through a smaller angle than the outer wheels 4. A second link 14 connects arm 11 to a bell crank lever 15 mounted on the chassis. A third link 16 connects the free end of one bell crank lever 15 to the already connected end of the other bell crank lever 15. The free end of this other lever is connected to an hydraulic piston and cylinder 17 pivoted to the chassis between the levers 15. Thus operation of the cylinder 17 turns all the wheels on one side of the vehicle together.

Figure 5:
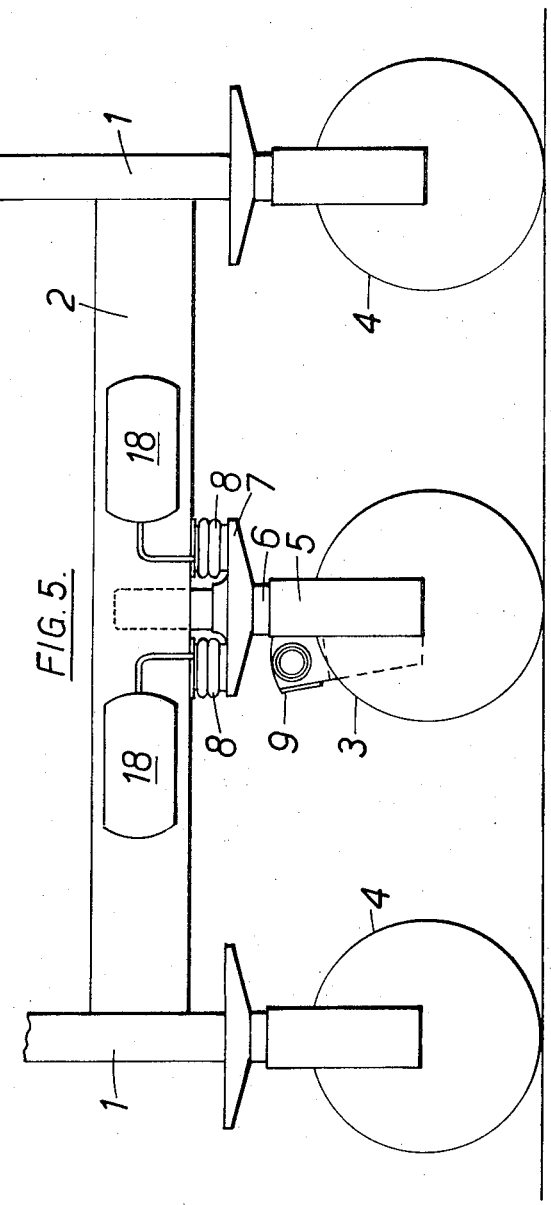
FIG. 5 is a side elevation of part of a straddle carrier having three wheels on each side.

The straddle carrier shown in FIG. 5 has only six wheels, a leading and trailing wheel 4 on each side unyieldingly connected to a leg 1 and a driving wheel 3 arranged intermediate the wheels 4 and suspended from the longitudinal member 2.

As seen best in FIG. 5 each suspension unit 8 comprises a bellows of rubber or like flexible material which is connected to a pressure vessel 18, the pressure vessel having a large volume compared with that of the bellows. The vessel and bellows are inflated with compressed air. The respective volumes of the pressure vessel and the bellows are chosen so that the volume/pressure change is small between the limits of deflection of the bellows. Thus the load on the suspended wheels can be arranged to increase by less than ten per cent on loading the vehicle.

In one example of an 8 wheel straddle carrier according to this invention the unladen weight of the vehicle is approximately 38 tons and the fully laden weight is approximately 50 tons. Under static conditions and on level ground the elastically suspended wheels are arranged so that each carry a load of about 7.4 tons. This increases by rather under five per cent, desirably of the order of 2 – 3 percent, when the vehicle is fully laden. The unsprung wheels will thus each carry a load of about 2.1 tons unladen and 5.1 tons fully laden.

Unevenness of the ground will cause a variation in these loads. For a four inch rise or fall of an elastically suspended wheel the load carried thereby may, by way of example only, increase or reduce by perhaps 9 to 15 percent as compared with the static load figure. In the example given a four inch drop of the sprung wheel resulted in a 13½ percent reduction (to 6.4 tons) in the load carried thereby and a four inch rise caused a 10 percent increase (to 8.2 tons) in the load carried by that wheel.

An advantage of the invention over an entirely unsprung arrangement is that the load on the inner wheels can be controlled even when a leading outer wheel encounters an obstacle and causes its inner wheel to be lifted. It is particularly advantageous for the load on a driving wheel to be substantially constant in all conditions, especially when the driving wheels are the only braked wheels, since the control of the vehicle is much improved.

I claim:

1. A self-propelled load carrying vehicle incorporating a chassis comprising front and rear frames of inverted U-shape, and a longitudinal member connecting the legs of each frame on each side of the vehicle, at least one wheel non-yieldingly attached to each side of the chassis adjacent each end of the chassis, at least one driving wheel on each side of the chassis arranged between said end wheels, and suspension means elastically suspending said driving wheels from the chassis so that said driving wheels support the major proportion of the unladen weight of the vehicle, whereby, when the vehicle is loaded, said suspension means deflect and the added load is supported by said end wheels, the loading on said driving wheels remaining substantially constant.

2. A self-propelled vehicle as in claim 1 having four wheels on each side arranged in two pairs, the wheels in each pair being arranged in tandem, and said suspension means suspending the inner wheel of each pair.

3. A self-propelled vehicle as in claim 2 in which the wheels of each pair have substantially vertical pivotal mountings to the vehicle and are interconnected by a steering mechanism.

4. A self-propelled vehicle as in claim 3 in which the pivotal mounting of the inner wheel of each pair comprises a generally vertical yoke, a steering tube extending upwardly from the yoke and connected to said steering mechanism, a bearing assembly carried by the vehicle chassis, the steering tube being rotatable in and slidable up and down in the bearing assembly.

5. A self-propelled vehicle as in claim 1 having three wheels on each side, one adjacent each end of the vehicle and the third wheel elastically suspended from the vehicle at a location substantially equally spaced from the other two wheels.

6. A self-propelled vehicle as in claim 1 in which the static load supported by the elastically suspended wheels increases by not more than ten per cent between unladen and fully laden conditions of the vehicle.

7. A self-propelled vehicle as in claim 6 in which said static load increases by not more than five per cent between unladen and fully laden conditions of the vehicle.

8. A self-propelled vehicle as in claim 1 in which the loading on an elastically suspended wheel at its limits of deflection does not vary by more than 20 per cent from the loading on that wheel when mid-way between the limits of deflection.

9. A self-propelled vehicle as in claim 8 in which the total variation between the loading on an elastically suspended wheel at its limits of deflection does not exceed 30 per cent of the loading on that wheel when mid-way between the limits of deflection.

10. A self-propelled vehicle as in claim 1 comprising a generally vertical yoke in which each driving wheel is mounted, a bridge member carried by said yoke, pneumatic suspension units arranged between said bridge member and said chassis and disposed in front of and behind a vertical axis through said yoke, and a pressurised air vessel being large compared to the volume of said units whereby the volume/pressure change of the pressurised air is relatively small between the limits of deflection of said units.

* * * * *